W. A. GUZEMAN.
Wind-Mill.
No. 165,326.
Patented July 6, 1875.
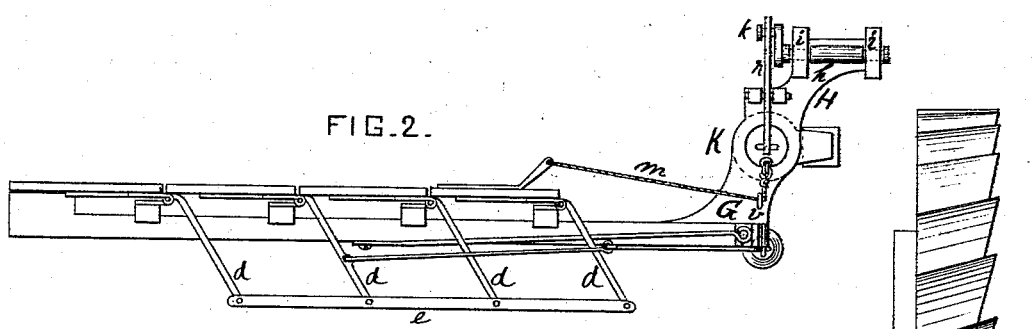
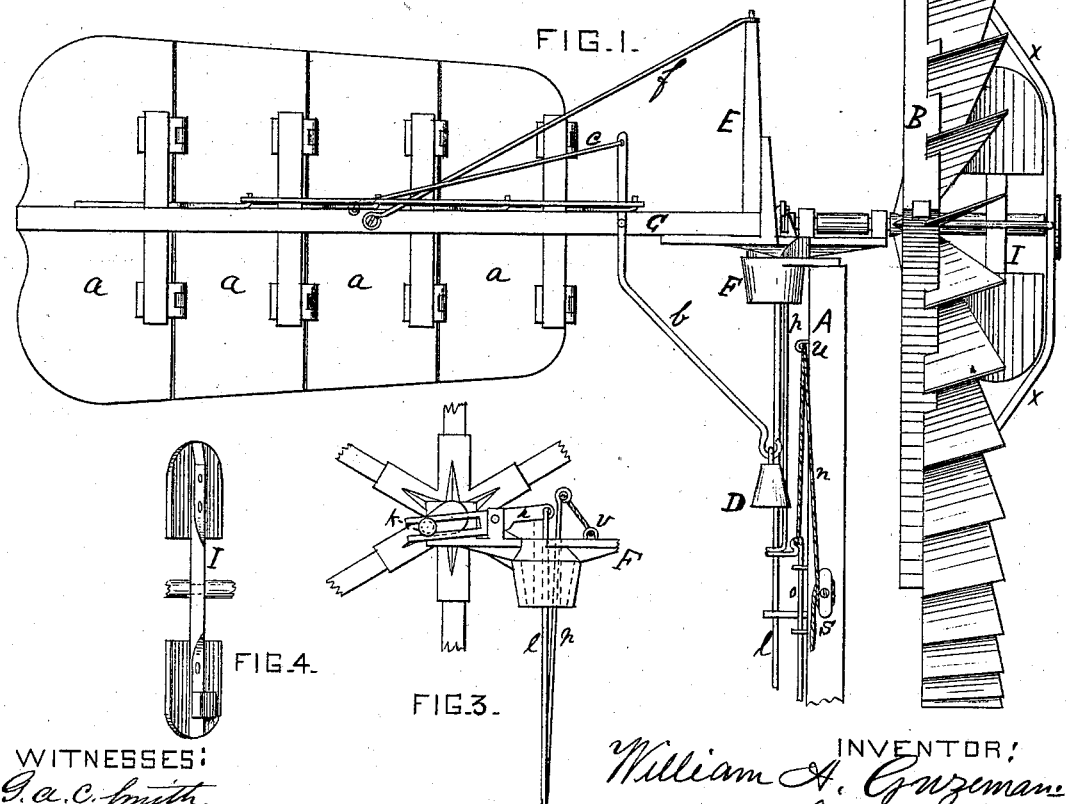
WITNESSES:
G. A. C. Smith
Frank Smith
INVENTOR:
William A. Guzeman
J. W. C. Perkins ATTORNEY.

UNITED STATES PATENT OFFICE.

WILLIAM A. GUZEMAN, OF WASHINGTON, IOWA, ASSIGNOR TO GEORGE S. TRIPP AND Z. ESTELLINE P. GUZEMAN, OF SAME PLACE.

IMPROVEMENT IN WINDMILLS.

Specification forming part of Letters Patent No. 165,326, dated July 6, 1875; application filed April 24, 1875.

*To all whom it may concern:*

Be it known that I, WILLIAM A. GUZEMAN, of Washington, in the county of Washington and State of Iowa, have invented a new and useful Improvement in Windmills; and I do hereby declare the following to be a full, clear, and exact description of the same, reference being had to the accompanying drawings, forming a part of this specification, in which—

Figure 1 is a perspective view of my invention; Fig. 2, a top-plan view. Fig. 3 is an end view of all the parts except the vane, and Fig. 4 is a detached view of the additional small vane.

The same letters of reference are used to indicate corresponding parts.

My invention shows a windmill which is automatic—that is, self-regulating. The vane is sectional, the sections being hinged to the vane-shaft, so as to open and shut like doors. A weight furnishes the power to keep the sections closed, and a wind strong enough to more than counterbalance this weight throws the sections of the vane open, and allows the wind-wheel to be turned out of the wind until it abates. Windmills have hitherto been constructed with the axis of the wind-wheel resting immediately on the top of the tower, and in a vertical plane with the vane-shaft, or nearly so. In my invention the axis of the wind-wheel is placed on one side of the top of the tower, and the vane-shaft is placed in a vertical parallel plane on the opposite side of the tower. Hence the wind will strike with the greater force that portion of the wind-wheel which shows the larger surface to one side of the tower. This will tend to move the wheel out of the face of a violent wind. In connection with the sectional vane, the utility of this feature will more fully appear. In a slight wind the vane holds the wind-wheel into the face of the wind, or nearly so, as the axis of the wind-wheel and the vane-shaft are in two parallel vertical planes on either side of the tower, which are at right angles with the face of the wheel; but as the wind increases the sections of the vane will open, and thus allow the wind-wheel to swing out of the direct face of the wind. As the wind diminishes the vane-sections are closed, and the wheel brought again into the face of the wind. In this manner my invention appears as a perfect self-regulating windmill.

There are other novel features in my invention, which will more fully appear in the description of the drawings and claims.

A represents the tower; B, the wind-wheel, and C the vane-shaft, to which the sections $a$ $a$, opening door-like, are attached by hinging them to pieces crossing the shaft at right angles. D is a weight, connected to the lever $c$ by means of the bent rod $b$. The lever $c$ is hinged to one of the rods $d$ $d$, which are held in a fixed relative position by the rod $e$. The rods $d$ $d$ are fastened to the vane-sections. It will be seen that by this device the weight D is elevated by opening the vane-sections. The vane-shaft C is supported by the brace $f$, connecting it with the top of the standard E. A bed-plate, F, is placed on the top of the tower A. In the bed-plate a turn-table, K, provided with two arms, revolves. To one of the arms, G, the vane-shaft is attached, and to the other arm, H, are attached two bearings, $i$ $i$, in which the axis $h$ of the wind-wheel revolves. The slotted lever $r$ connects the crank-shaft $k$ with the pitman $l$. One end of the rod $o$, moving in loops fastened to the tower A, is so looped as to slide on the pitman $l$ and support the rod $p$, also looped to slide in a similar manner. The rope $m$ is fastened to a projecting arm on one of the vane-sections, and, passing over the pulley $v$, which is fixed to the turn-table K, it connects to the upper end of the rod $p$. The rope $n$ passes over the pulley $u$, which is fixed to the tower A, and is fastened to the upper end of the rod $o$. Thus, by pulling the rope $n$, the sectional vanes $a$ $a$ are opened, and will remain open when the rope is fastened to the belaying-cleat S. The additional vane I is secured to the extended axis of the wind-wheel and in front of it. It is weighted on one end to keep it in a fixed position, so that it will not be affected by the revolution of the shaft of the wind-wheel. The advantage of this vane is to offer a resisting surface to the wind when the wind-wheel stands edgewise or obliquely to the wind, thus steadying the mill in the socket. The braces $x$ $x$ are fastened to the wind-wheel and supported by its axis, and give firmness to the wheel. The slotted lever *r*, connecting the crank-shaft *k* with pitman *l*, gives my windmill great additional power, as the power of the wheel is applied when the crank-shaft is the farthest from the fulcrum, thus exerting greater lifting power, fully fifty per cent. more than ordinary windmills, and by its use the stroke of the pitman can be lengthened or shortened without affecting the power of the wheel.

Having now described my invention, what I claim, and desire to secure by Letters Patent, is—

1. The combination of the sectional vanes on the vane-shaft, arranged with relation to each other as described, and operated by a weight, as hereinbefore shown and described.

2. The rope *n*, pulley *u*, and rod *o*, in combination with rod *p*, pulley *v*, and cord *m*, as before specified and set forth.

3. In a windmill, the additional vane I, in combination with the wind-wheel B, vane C, and tower A.

4. The turn-table K, provided with one arm for supporting the vane-shaft, and another arm for supporting the bearings of the wind-wheel, each on opposite sides of the tower and in vertical parallel planes to each other.

5. The tower A, wind-wheel B, additional vane I, braces *x x*, shaft *h*, slotted lever *r*, bed-plate F, vane-shaft C, provided with sectional vanes *a a*, rods *b c d e*, and weight D, and rods *o p* and their connections for closing and opening the vane-sections, as before shown.

In witness that I claim the foregoing I have hereunto set my hand this 16th day of March, 1875.

WM. A. GUZEMAN.

Witnesses:
M. C. PARKER,
V. P. EASTMAN.